Oct. 17, 1944.          W. H. STENZ          2,360,802
GUIDE FOR FISHING POLES
Filed Oct. 6, 1941
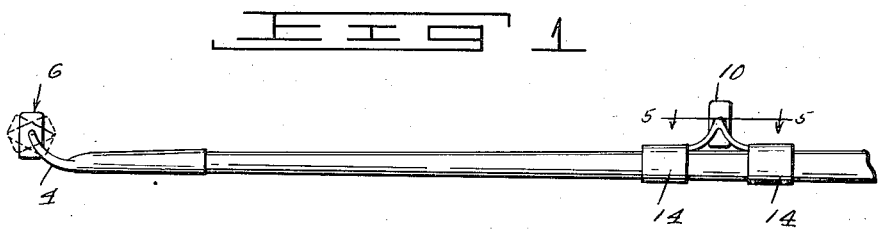
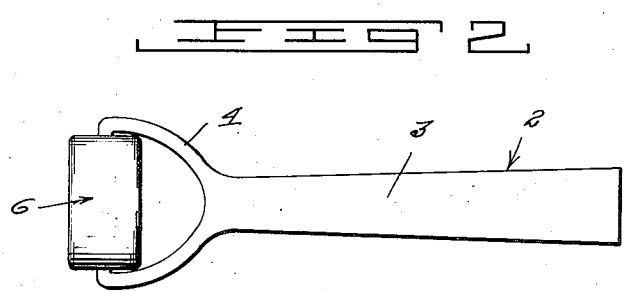
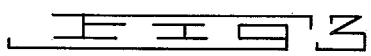 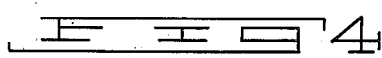
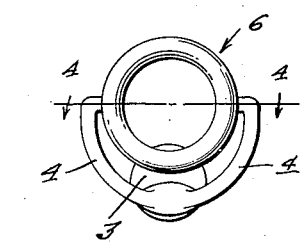 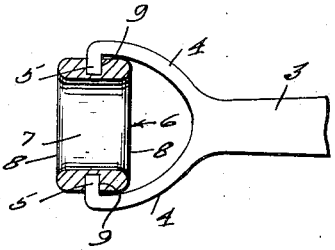
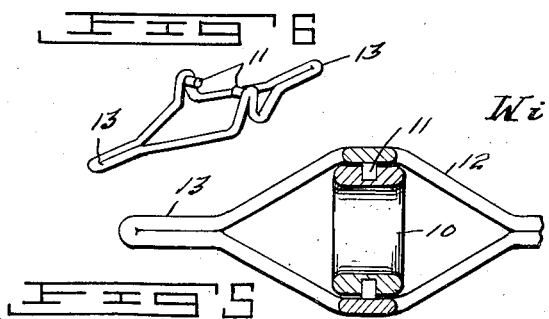
Inventor
William H. Stenz
By Clarence A. O'Brien
Attorney Patented Oct. 17, 1944

2,360,802

UNITED STATES PATENT OFFICE 2,360,802

GUIDE FOR FISHING POLES

William H. Stenz, Fond du Lac, Wis.

Application October 6, 1941, Serial No. 413,842

2 Claims. (Cl. 43—24)

My invention relates to improvements in line guides for fish poles, the principal object in view being to equip such poles with inexpensive, easily applied guides adjustable under the pull of the line at different angles to the pole in casting, to obviate wear on the line incident to friction and to reduce frictional resistance to flow of the line so that the latter may be thrown out and retrieved easily and quickly.

Other and subordinate objects are also comprehended by my invention, all of which, together with the precise nature of my improvements, will be readily understood when the succeeding description and claims are read with reference to the drawing accompanying and forming part of this specification.

In said drawing:

Figure 1 is a view in side elevation of a portion of a fish pole equipped according to my invention, Figure 2 is a view in top plan of the tip guide, Figure 3 is a view in front elevation of the tip guide, Figure 4 is a view in transverse section taken on the line 4—4 of Figure 3, Figure 5 is a view in horizontal section of the first line guide, and Figure 6 is a view in perspective of the mounting for the first line guide.

According to my invention, the pole 1 is equipped with a tip 2 comprising an outwardly tapered sleeve 3 fitted to the pole 1 and suitably secured thereon, said sleeve having a bifurcated outer end yoke curving to one side of the sleeve and pole, and comprising a pair of outwardly bowed arms 4 terminating in a pair of inturned trunnions 5 axially aligned transversely of the axis of the sleeve and the pole 1. An annular tip guide 6, having a flat inner face 7 and rounded internal edges 8, is swingably mounted on the trunnions 5 to rock between the arms 4, and by means of a pair of diametrically opposite sockets 9 provided in said guide for accommodating the trunnions 5 therein.

At an appropriate point on the pole 1, adjacent the hand grip, or reel end, not shown, an annular first line guide 10 of the same general construction as the tip guide 6 is mounted on the same side of the pole 1 as that toward which the tip guide 6 is offset by the yoke arms 4.

The first line guide 10 is swingably mounted on trunnions 11 in a manner similar to that in which the tip line guide 6 is mounted. The trunnions are supported by an open wire frame 12 having end extensions 13 by means of which, and a pair of metal sleeves 14 fitting around the pole 1 and over said extensions 13, said frame is detachably and adjustably secured against the appropriate side of the pole 1.

As will be manifest, by virtue of the described manner in which the tip guide 6 is mounted, it is free to oscillate, under weight, or pull of the line against the same, into substantially right angular relation to the angle of the line extending from the tip of the pole, so that when said line is run out, or retrieved, at any angle the inner face 7 and edges 8 of said tip guide 6 engage the line so as to minimize friction and wear on said line.

In casting with a fly, or other lure, it is the practice to run off, or strip by hand, from the reel the length of line to equal the cast and to bank the length thus stripped in a slack loop before the fisherman. In this operation the line is pulled out at various angles to the pole. The described first line guide 10 being mounted as described oscillates under this operation into substantially right angular relation to the angle at which the line is pulled so that at this end of the pole the friction and wear are also reduced to a negligible factor.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the subjoined claims.

What I claim is:

1. A line guide for a fishing pole comprising an annular member having rounded internal edges, and means adapted to attach said member to said pole to swing about an axis under the action of the line against the member, said means comprising a pair of axially aligned trunnions countersunk in diametrically opposite sides of said member, said means including a sleeve for attaching the trunnions to the pole.

2. A line guide for a fishing pole comprising an annular member having rounded internal edges, and means adapted to attach said member to said pole to swing about an axis under the action of the line against the member, said means comprising a pair of axially aligned trunnions countersunk in diametrically opposite sides of said member, said means comprising a sleeve fitting over the tip of said pole.

WILLIAM H. STENZ.